US012259692B2

(12) United States Patent
Mansouri et al.

(10) Patent No.: US 12,259,692 B2
(45) Date of Patent: Mar. 25, 2025

(54) METHOD FOR ESTIMATING THE REMAINING SERVICE LIFE OF SUBJECT EQUIPMENT

(71) Applicants: SAFRAN ELECTRONICS & DEFENSE, Paris (FR); CENTRE NATIONAL DE LA RECHERCHE SCIENTIFIQUE, Paris (FR)

(72) Inventors: Badr Mansouri, Moissy-Cramayel (FR); Romain Breuneval, Moissy-Cramayel (FR); Guy Clerc, Moissy-Cramayel (FR); Babak Nahid-Mobarakeh, Moissy-Cramayel (FR)

(73) Assignees: CENTRE NATIONAL DE LA RECHERCHE SCIENTIFIQUE, Paris (FR); SAFRAN ELECTRONICS & DEFENSE, Boulogne-Billancourt (FR)

( * ) Notice: Subject to any disclaimer, the term of this patent is extended or adjusted under 35 U.S.C. 154(b) by 507 days.

(21) Appl. No.: 17/625,010

(22) PCT Filed: Jul. 2, 2020

(86) PCT No.: PCT/EP2020/068705
§ 371 (c)(1),
(2) Date: Jan. 5, 2022

(87) PCT Pub. No.: WO2021/004896
PCT Pub. Date: Jan. 14, 2021

(65) Prior Publication Data
US 2022/0260957 A1    Aug. 18, 2022

(30) Foreign Application Priority Data
Jul. 5, 2019 (FR) .................................... 1907561

(51) Int. Cl.
*G05B 13/02* (2006.01)
*G07C 3/00* (2006.01)

(52) U.S. Cl.
CPC .......... *G05B 13/026* (2013.01); *G07C 3/005* (2013.01)

(58) Field of Classification Search
CPC ............... G05B 13/026; G05B 13/024; G05B 13/0283; G06N 3/043
See application file for complete search history.

(56) References Cited

U.S. PATENT DOCUMENTS 10,753,192 B2 *  8/2020  Eslinger .............. F04D 15/0088
2008/0183404 A1 *  7/2008  Emami .................. G01R 31/50
                                                                 702/34

(Continued)

OTHER PUBLICATIONS

Moghaddass et al., "An integrated framework for online diagnostic and prognostic health monitoring using a multistate deterioration process.", Realiability Engineering and System Safety, Elsevier Applied Science, vol. 124, Nov. 26, 2013, pp. 92-104.
Miao et al., "Condition multi-classification and evaluation of system degradation process using an improved support vector machine," Microelectronics and Redliability, vol. 75, Apr. 25, 2017, pageds 223-232.

(Continued)

*Primary Examiner* — Lam S Nguyen
(74) *Attorney, Agent, or Firm* — MUNCY, GEISSLER, OLDS & LOWE, P.C.

(57) ABSTRACT

A method for estimating a Remaining Useful Life of a subject equipment, with a preliminary phase including the following steps: acquire test observations (step 10) and produce test time series ($S_x$) of at least one signature; partition the test time series to obtain severity classes corresponding to the ageing phases of the test equipment devices (step 14); carry out an initial learning of a diagnosis model on the test equipment devices (step 45); perform a second learning of a signature prediction model (step 51). There is also an operational phase including the following steps: acquire observations when in operation on the subject (Continued)

equipment and produce an extrapolated time series using the prediction model; classify the extrapolated time series using the diagnosis model and derive the remaining useful life of the subject equipment.

9 Claims, 12 Drawing Sheets

(56) References Cited

U.S. PATENT DOCUMENTS

| | | | | |
|---|---|---|---|---|
| 2008/0208487 A1* | 8/2008 | Goebel | ............... | G06N 3/043 |
| | | | | 702/34 |
| 2016/0202693 A1* | 7/2016 | Noda | ............... | G05B 23/0283 |
| | | | | 702/183 |

OTHER PUBLICATIONS

Cannarile et al., "An unsupervised clustering method for assessing the degradation state of cutting tools used in the packaging industry," Safety and Reliability—Theory and Applications, Jun. 2017, 11 pages.

Shen et al., "A Monotonic Degradation Assessment Index of Rolling Bearings Using Fuzzy Support Vector Data Description and Running Time," Sensors, vol. 12, No. 8, Jul. 26, 2012, pp. 10109-10135.

Pan et al., "A Hybrid Model for Bearing Performance Degradation Assessement based on Support Vector Data Description and Fuzzy C-Means," Proceedings of the Institution of Mechanical Engineers, Part C, Journal of Mechanical Engineering Science, vol. 223, No. 11, Jul. 10, 2009, pp. 2687-2695.

* cited by examiner

METHOD FOR ESTIMATING THE REMAINING SERVICE LIFE OF SUBJECT EQUIPMENT

BACKGROUND OF THE INVENTION

A Health-Monitoring process, commonly known as PHM (for Prognostics & Health Management) although it is also referred to, but less frequently, as condition-based maintenance, predictive maintenance or forecast maintenance, is used to anticipate the degradation of an equipment or a system, particularly in the aeronautical field.

A Health-Monitoring process thus makes it possible to avoid breakdowns, optimise service life, anticipate and plan maintenance operations (and possible removal), and thus reduce the costs of equipment or system maintenance operations.

A Health-Monitoring process consists of five main steps: data acquisition, data processing (or preconditioning), signature extraction, diagnosis and prognosis.

The data-acquisition step consists of acquiring data produced by sensors measuring parameters representative of a performance of the equipment or the system. Data acquisition is for example carried out via testing, or by downloading to the equipment or system when it is operational.

The data-preconditioning step includes filtering data to remove measurement noise from the data.

The signature-extraction step consists of processing the data to extract one or more signatures representative of the state of the equipment or system and, possibly, of a degradation of the operation of the equipment or system.

The diagnosis step consists of determining the state of health of the equipment or system at the current time from a set of fault classes (failure modes), each associated with a severity level.

The prognosis step consists in estimating the Remaining Useful Life)(RUL) of the equipment or system.

PURPOSE OF THE INVENTION

The purpose of the invention is to reliably and accurately estimate the Remaining Useful Life of a piece of subject equipment.

SUMMARY OF THE INVENTION

In order to achieve this goal, a method for estimating a Remaining Useful Life of a subject equipment is proposed, with a preliminary phase comprising the following steps:
  acquire test observations on test equipment devices similar to the subject equipment;
  produce, from the test observations, test time series of at least one signature;
  partition the test time series to obtain severity classes corresponding to the ageing phases of the test equipment devices;
  carry out a first learning of a diagnosis model on the test equipment devices;
  perform a second learning of a signature prediction model;
and an operational phase comprising the following steps:
  acquire observations when in operation on the subject equipment;
  produce an extrapolated time series representative of the evolution of the signature on the subject equipment using the prediction model;
  classify the extrapolated time series using the diagnosis model;
  calculate a membership function of the extrapolated time series to the severity classes;
  deduce, from the membership function, the Remaining Useful Life of the subject equipment.

The estimation method according to the invention therefore implements, during a preliminary phase carried out for example in the laboratory, a first learning of a diagnosis model and a second learning of a prediction model on at least one signature resulting from observations made on test equipment devices.

Then, during an operational phase, observations are made in real time on the subject equipment, and, at a "present" time t, the evolution of the signature on the subject equipment is extrapolated thanks to the prediction model and then classified thanks to the diagnosis model. The severity class membership function then provides a reliable and accurate estimate of the Remaining Useful Life of the subject equipment, which is based on the behaviour of test equipment devices under similar stresses, the test equipment devices being equipment similar to the subject equipment.

An estimation method such as the one just described is also proposed, in which the estimated Remaining Useful Life is such that:

$$\overline{RUL} = q - t$$

where q is an estimated end-of-life time and t is a current time, and where, at the estimated end-of-life time q, the last severity class membership function becomes greater than the penultimate severity class membership function.

An estimation method such as the one just described is also proposed, in which a temporal consistency criterion is used to define a number of severity classes produced by the partitioning.

In addition, an estimation method such as the one just described is proposed, in which the temporal consistency criterion is evaluated using a first metric defined by:

$$CT_k = \sum_{i=2}^{m_u} ct\left(x_k^{(i)}, x_k^{(i-1)}\right)$$

where $x_k^{(i)}$ is an $i^{th}$ test observation acquired for test equipment k and where ct is a temporal consistency between two successive test observations and is defined using the following formula:

$$ct\left(x_k^{(i)}, x_k^{(i-1)}\right) = \begin{cases} 1, si\ y_k^{(i)} = y_k^{(i-1)} \\ 0, si\ y_k^{(i)} \neq y_k^{(i-1)} \end{cases}$$

where $y_k^{(i)}$ is the severity class of the observation $x_k^{(i)}$.

An estimation method such as the one just described is also proposed, in which a second metric, which is an energy metric, is evaluated to select a partitioning algorithm.

An estimation method as described above is further proposed, where the energy metric is defined by:

$$E_{par} = \frac{1}{2} \sum_{i \in \{1,\ldots,c\}} \sum_{x^{(j)} \in \Omega_i} \|x^{(j)} - g_i\|_d^2$$

where $\Omega_i$ is a set of test observations of an $i^{th}$ class, the $x^{(j)} \in \mathbb{R}$ p are the test observations, $g_i$ is a centre of gravity of the $i^{th}$ severity class, d is a distance measure and is defined by:

$$d_{ij}^2 = d(x^{(j)}, g_i)^2 = \|x^{(j)} - g_i\|_d^2 = (x^{(j)} - g_i)^T A_d (x^{(j)} - g_i)$$

where $A_d$ is a positive semidefinite matrix defining a distance metric, and where the symbol "$\| \ \|_d$" represents the norm corresponding to the distance d.

An estimation method such as the one just described is also proposed, in which the partitioning algorithm is a Fuzzy C-Mean algorithm.

An estimation method such as the one just described is also proposed, in which the prediction model is trained with a multi-step iterative method.

An estimation method such as the one just described is also proposed, in which the prediction model is constructed from a non-linear SVR regression.

In addition, an estimation method such as the one just described is proposed, in which the first learning of the diagnosis model uses a Fuzzy SVM-FA classification algorithm.

The invention will be better understood when reading the following description of a particular non-restrictive embodiment of the invention.

BRIEF DESCRIPTION OF THE DRAWINGS

Reference is made to the appended drawings, wherein.

DETAILED DESCRIPTION OF THE INVENTION

The present invention is implemented in a Health-Monitoring process, and relates to a method for estimating the remaining useful life of a subject equipment.

The invention therefore relates more specifically to the "prognosis" stage of the Health-Monitoring process.

Here, by "prognosis" and according to the ISO 13381 standard, we mean: "the estimation of the duration of operation before failure and the risk of the existence or subsequent occurrence of one or more failure modes". By adopting a system-oriented interpretation that takes into account the interactions between the components of the system, the component is considered to reach its end of life when its state of damage causes or accelerates the damage of other components. The term "subject equipment" should be interpreted very broadly. The subject equipment may be any equipment, for example an LRU (Line Replaceable Unit) such as an actuator, or a system comprising several pieces of equipment interacting with each other, or an electrical or mechanical component of any complexity. The subject equipment is here embodied in an aircraft, but the invention is not limited to such an application.

It is assumed in the following that the subject equipment is not being rejuvenated and is not being subjected to any maintenance action that would restore it to a previous state of health. Thus, its Remaining Useful Life (RUL) is linearly decreasing with time t:

$$RUL = t_{EOL} - t,$$

where $t_{EOL}$ is the End of Life of the subject equipment.

Time can be considered in different ways depending on the application.

The time since commissioning can be counted. The cumulative running time can also be used. For an electromechanical actuator, this corresponds to the phases when the electromechanical actuator is energised. Here, in the context of an aeronautical system, which is very strict in terms of component traceability, both time information is available. The time taken into account could also be the number of cycles of use when it comes to the considered deterministic speed/load profiles.

Here, the cumulative operating time is used.

It is also considered that the subject equipment degrades only during operation. Indeed, for an actuator of an aeronautical system, and in particular for an actuator integrated in a single-aisle aircraft, the waiting phases, on the tarmac or in the hangar, are low compared to the operating times.

The estimation process comprises a plurality of steps. These steps are implemented in a preliminary phase and then in an operational phase. The preliminary phase is carried out on test equipment devices similar to the subject equipment, and is at least partially implemented in a laboratory or design office. The operational phase is implemented while the subject equipment is in operation.

Each step will be described theoretically and then illustrated with an application example.

Figure 1:
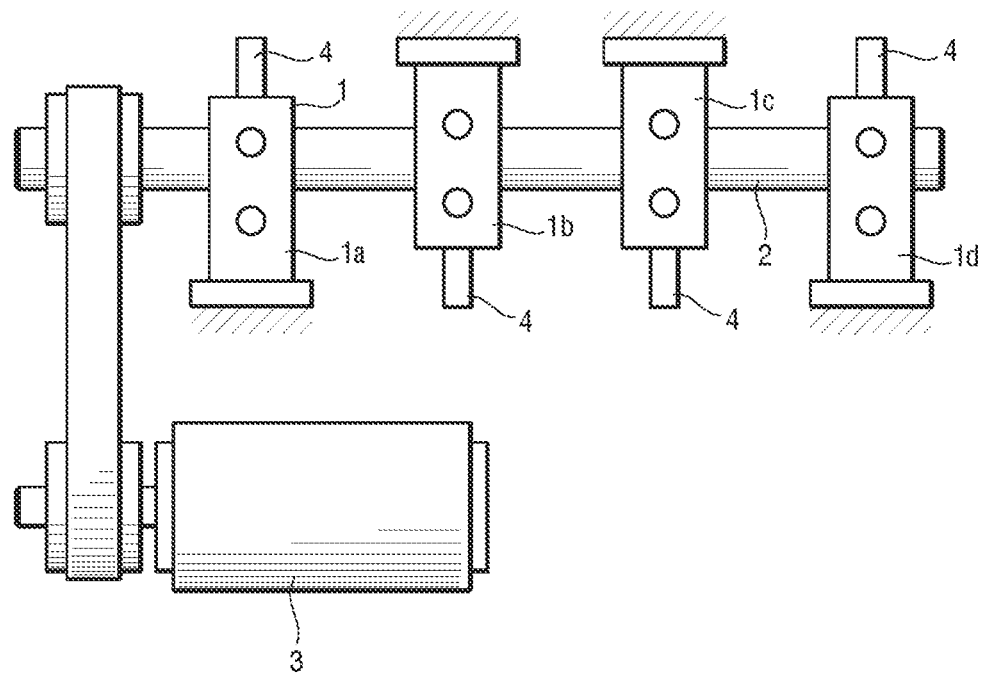
FIG. 1 shows roller bearings mounted on a shaft which is rotated by an electric motor.

With reference to FIG. 1, the example application is taken from a public database, namely a benchmark bearing ageing database, from tests conducted at the University of Cincinnati's Center for Intelligent Maintenance System (IMS).

This public data is provided by NASA (Lee J, Qiu H, Yu G, Lin J, Rexnord Technical Services. Bearing Data Set [Internet]. IMS, University of Cincinnati, NASA Ames Prognostics Data Repository (http://ti.arc.nasa.gov/project/prognostic-data-repository), NASA Ames Research Center, Moffett Field, CA; 2007. They are available on: https://ti.arc.nasa.gov/tech/dash/pcoe/prognostic-data-repository/ Qiu et al. 2006; Lee et al. 2007). Four roller bearings 1a, 1b, 1c, 1d are placed on a single shaft 2 driven by a motor 3 to rotate at 2000 rpm. A spring mechanism applies a constant radial load of 6000 pounds, or 26,698 N.

Figure 2:
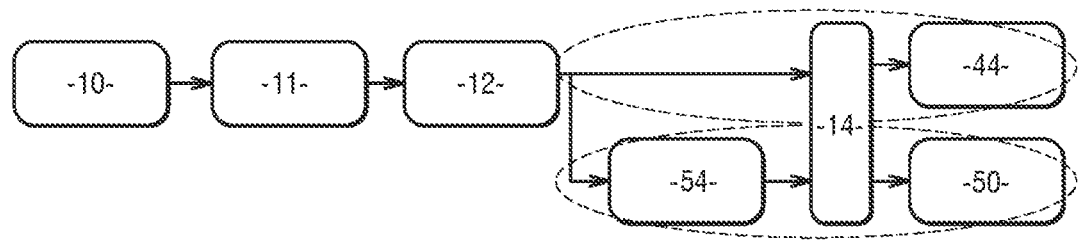
FIG. 2 shows the operational steps of the diagnosis and prognosis process according to the invention.
Figure 3:
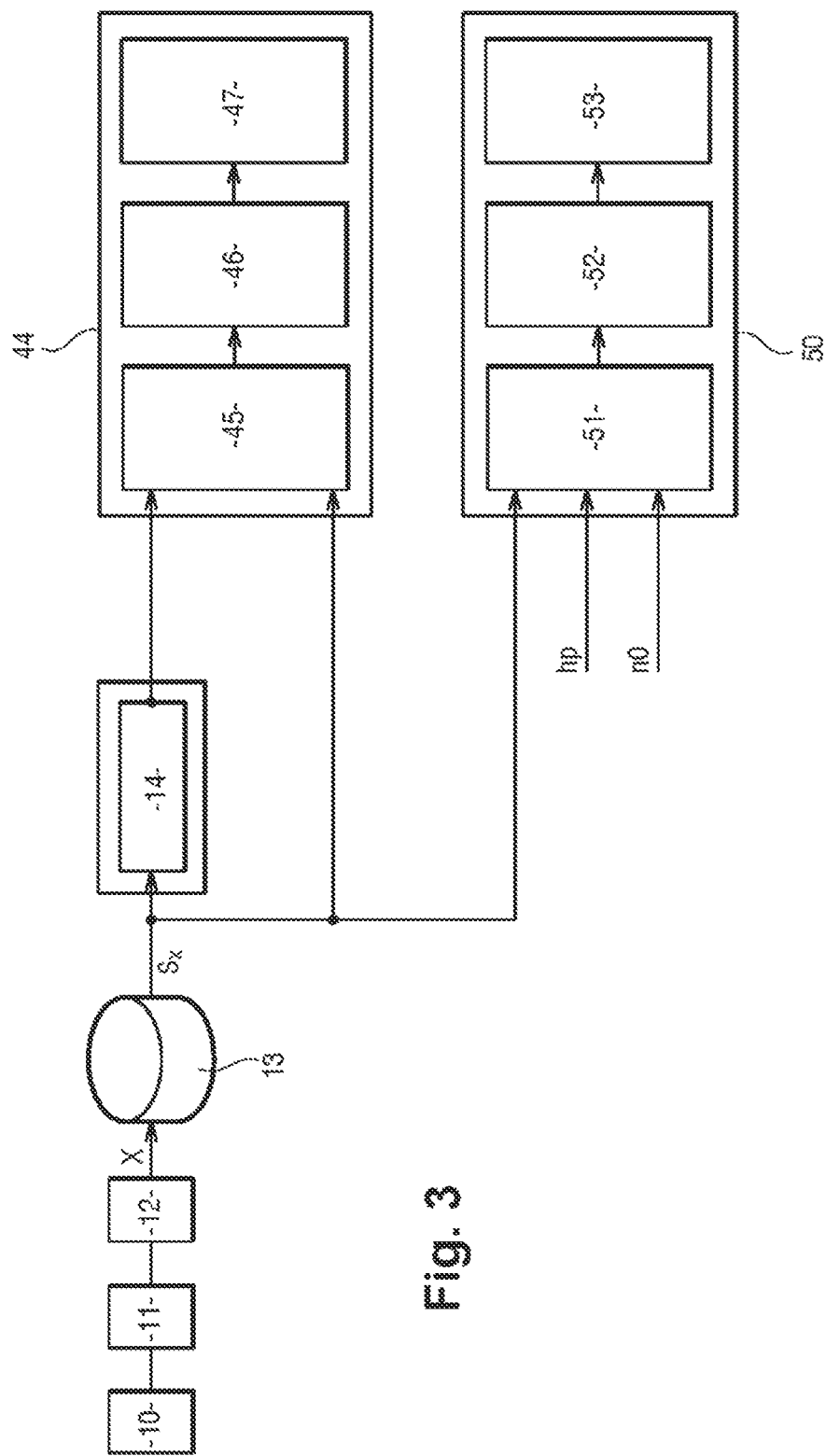
FIG. 3 shows the operational steps of the diagnosis and prognosis process according to the invention.

With reference to FIGS. 2 and 3, the preliminary phase firstly comprises a step of acquiring test observations 10 which is here carried out via tests on test equipment devices. In the application example, both the test equipment devices and the subject equipment are roller bearings 1. It is noted that they could perfectly well be ball bearings.

We carry out $m_u$ observations on $n_u$ test equipment devices.

In the application example, the observations are made by means of accelerometers 4 integrated in the bearings 1.

The preliminary phase of the estimation process then includes a step of preconditioning the data 11.

The preliminary phase then includes a signature extraction step 12.

The vector of fault signatures is denoted by X: X=[x1, x2, . . . , xp], where p is the number of fault signatures. A signature is a quantity that is sensitive to the degradation of the test equipment devices (and the subject equipment).

The signatures that are used here are the power of the vibration signal and the RMS value of the vibration signal.

The signatures are stored in a database 13.

Time series signatures are then produced. Each $S_X$ signature time series corresponds to the evolution of the signature over time.

The estimation process then includes an automatic partitioning step 14 of the data to create successive classes. The classes are also called failure modes, failure levels or severity classes. The classes correspond to ageing phases of the test equipment devices.

The goal of the partitioning is to identify, from the $m_u$ observations made on the $n_u$ test equipment devices, the different severities of defects present in the database. Thus, it will be necessary to partition $m=m_u*n_u$ observations. Each observation corresponds to a vector of shapes with p parameters. A test equipment device is therefore represented by p time series (one time series per shape vector signature). The resulting severity classes should be temporally consistent across all test equipment devices.

For each test equipment device, each class will be defined by a start time $t_{start}$ and an end time $t_{stop}$. The severity classes are arranged from least to most severe. Thus, the $t_{stop}$ of a class will be the $t_{start}$ of the next class.

Figure 4:
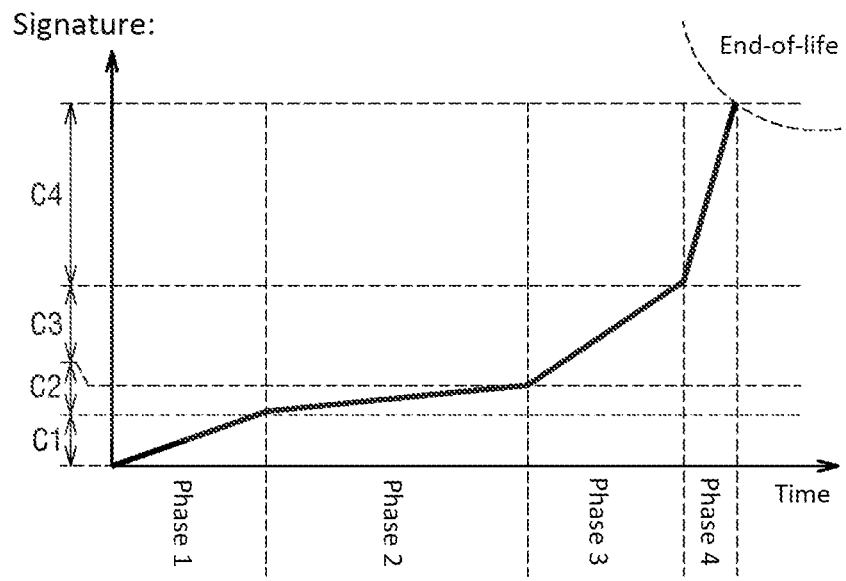
FIG. 4 shows the partitioning of a time series of a signature.

In the example in FIG. 4, four classes c1, c2, c3 and c4 are shown.

First of all, we try to define an optimised number of classes.

The partitioning of time series classically contains three main categories of problems: partitioning of whole time series clustering, subsequences clustering and time point clustering.

The partitioning of whole time series consists of considering each series as an object and forming groups of whole series. This type of partitioning is equivalent to classical partitioning but using integer time series rather than shape vectors. The aim of subsequence partitioning is to determine subsequences that repeat in a single time series. The partitioning of time series points consists of assigning classes based on temporal proximity and values within a single series.

None of these categories corresponds exactly to the problematic of the invention. Partitioning entire time series is not suitable, since the objective is to find successive sequences. Sub-sequence partitioning is also not suitable as it works from a single sequence. The same applies to the partitioning of time points. The problem here is to deal with $n_u*p$ sequences, linked to each other.

A criterion of temporal consistency of the partitioning is therefore defined and used to choose the number of classes.

A definition of temporal consistency of partitioning is given here. It is based on three conditions:

the number of classes is identical from one test equipment device to another;

each class is continuous in time: there is no "jump" in time;

the classes follow each other in the same order from one test equipment device to another.

The following first metric is proposed to evaluate the temporal consistency on observations of a test equipment device, which are ordered in increasing time:

$$CT_k = \sum_{i=2}^{m_u} ct(x_k^{(i)}, x_k^{(i-1)})$$

where $x_k^{(i)}$ is the $i^{th}$ observation measured for test equipment devices k and where ct is the temporal consistency between two successive observations and is defined using the following formula:

$$ct(x_k^{(i)}, x_k^{(i-1)}) = \begin{cases} 1, \text{si } y_k^{(i)} = y_k^{(i-1)} \\ 0, \text{si } y_k^{(i)} \neq y_k^{(i-1)} \end{cases}$$

where $y_k^{(i)}$ is the class of the observation $x_k^{(i)}$.

For a given test equipment devices k, the resulting partitioning is perfectly consistent for $CT_k=c-1$, where c is the number of classes.

Conversely, if the partitioning is totally inconsistent, we have $CT=m_u-1$ where $m_u$ is the number of observations. To facilitate the interpretation of the first metric and its use for comparisons, an equivalent version is defined with values in [0,1]:

$$CTN_k = \frac{\sum_{i=2}^{m_u} ct(x_k^{(i)}, x_k^{(i-1)}) - (c-1)}{m_u - c}$$

For a perfectly temporally consistent partitioning, we have:

$CTN=0$.

For a completely inconsistent partitioning, we have:

$CTN=1$.

For a partitioning where the number of classes is different from one test equipment devices to another, we have:

$CTN<0$.

We can now calculate the overall temporal consistency, over all the test equipment devices, using the following formula:

$$CTG = \frac{\sum_{i=1}^{n_u} |CTN_i|}{n_u}$$

where "|" is the absolute value symbol.

The first metric verifies the first two conditions, i.e. the number of identical classes per test equipment devices and temporal continuity, but not the third condition. The third condition can nevertheless be verified by plotting the evolution of signatures over time for partitioned observations.

A partitioning algorithm should also be selected. For a given number of classes, if several partitioning algorithms are perfectly consistent, a second metric is evaluated to select the partitioning algorithm. The second metric is an energy metric, which must be minimised to have the most compact classes possible. The second metric is calculated using the following formula:

$$E_{par} = \frac{1}{2} \sum_{i \in \{1,\ldots,c\}} \sum_{x^{(j)} \in \Omega_i} \|x^{(j)} - g_i\|_d^2$$

where $\Omega_i$ is the set of observations of the $i^{th}$ class, the $x^{(j)} \in \mathbb{R}^p$ are the observations, $g_i$ is the centre of gravity of the $i^{th}$ class, d is the distance measure and is defined by the following formula:

$$d_{ij}^2 = d(x^{(j)}, g_i)^2 = \|x^{(j)} - g_i\|_d^2 = (x^{(j)} - g_i)^T A_d (x^{(j)} - g_i)$$

where $A_d$ is a positive semidefinite matrix defining the distance metric d (chosen by the user), and where the symbol "$\| \|_d$" represents the norm corresponding to the distance d.

Here, the Euclidean distance is adopted with:

$A_d = I$, the identity matrix.

Four algorithms, classically used for unsupervised partitioning, were evaluated: the K-means algorithm, the K-means algorithm, the C-means fuzzy algorithm and the C-Fuzzy means possibility algorithm.

Figure 5:
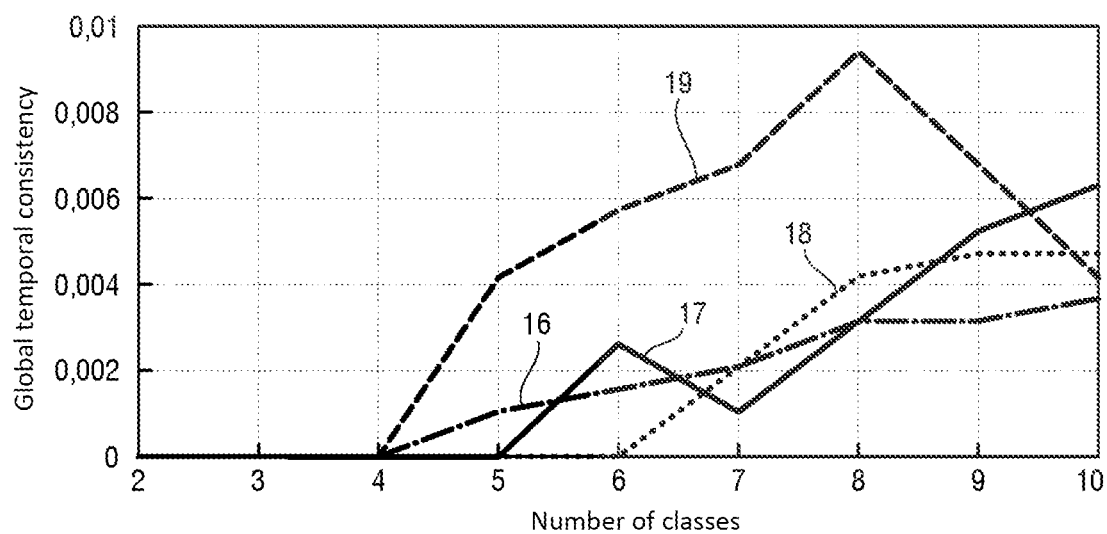
FIG. 5 is a plot of global temporal consistency curves as a function of the number of classes for four partitioning algorithms.

With reference to FIG. 5, the four algorithms process the database for a number of classes ranging from 2 to 10. For each number of classes and for each algorithm, the normalised global temporal consistency is calculated: curve 16 corresponds to the K-means algorithm, curve 17 corresponds to the K-means algorithm, curve 18 corresponds to the C-means fuzzy algorithm and curve 19 corresponds to the C-means fuzzy possibility algorithm.

We notice that for c>6, all partitionings are inconsistent, whatever the chosen algorithm. We then notice that only the Fuzzy C-Mean algorithm gives consistent results between c=4 and c=6.

Figure 6:
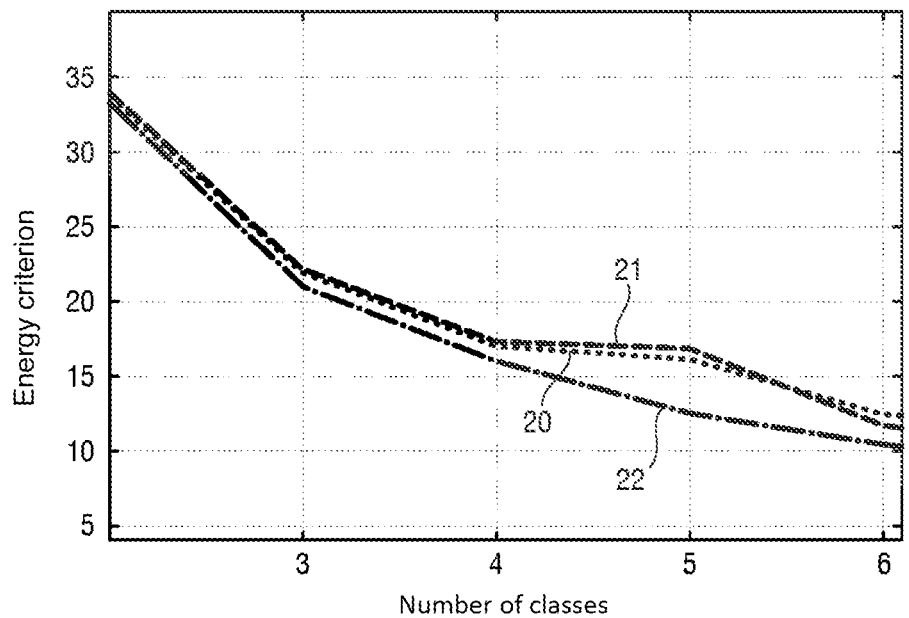
FIG. 6 is a graph showing the curves of an energy criterion as a function of the number of classes, for the four partitioning algorithms.

With reference to FIG. 6, to confirm this result, the second energy metric is evaluated for c up to 6. Curve 20 corresponds to the K-means algorithm, curve 21 corresponds to the K-means algorithm and curve 22 corresponds to the C-means fuzzy algorithm.

The curve corresponding to the C-Mean Fuzzy Possibilities algorithm is off the graph, as this curve reaches too high values. It is clear that the Fuzzy C-Mean algorithm has the lowest energy, whatever the number of classes on the interval considered. This algorithm is therefore selected.

Figure 7:
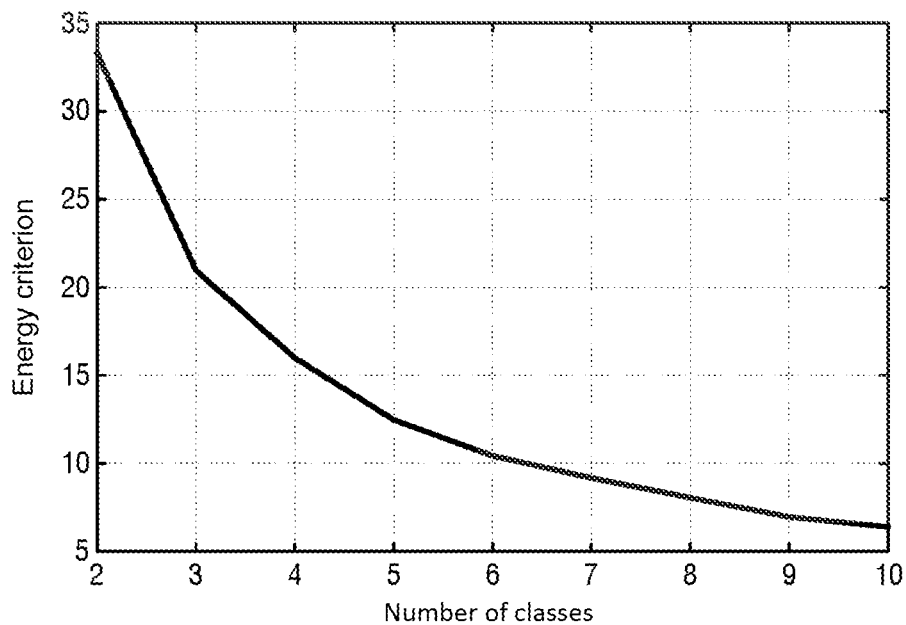
FIG. 7 is a plot of the energy criterion versus the number of classes for the C-Fuzzy Mean partitioning algorithm.

Note that the C-Fuzzy means algorithm was developed as an improvement of the K-Fuzzy algorithm. It is considered that an observation can belong to several classes at the same time but with different degrees. With reference to FIG. 7, too many classes cannot be chosen here, as this would imply too large an increase in computational costs. Thus, as with the selection of parameters, the choice of the number of classes will be made at the "elbow" of the evolution of the criterion. Here, therefore, we will consider cases with three, four and five classes.

Figure 8:
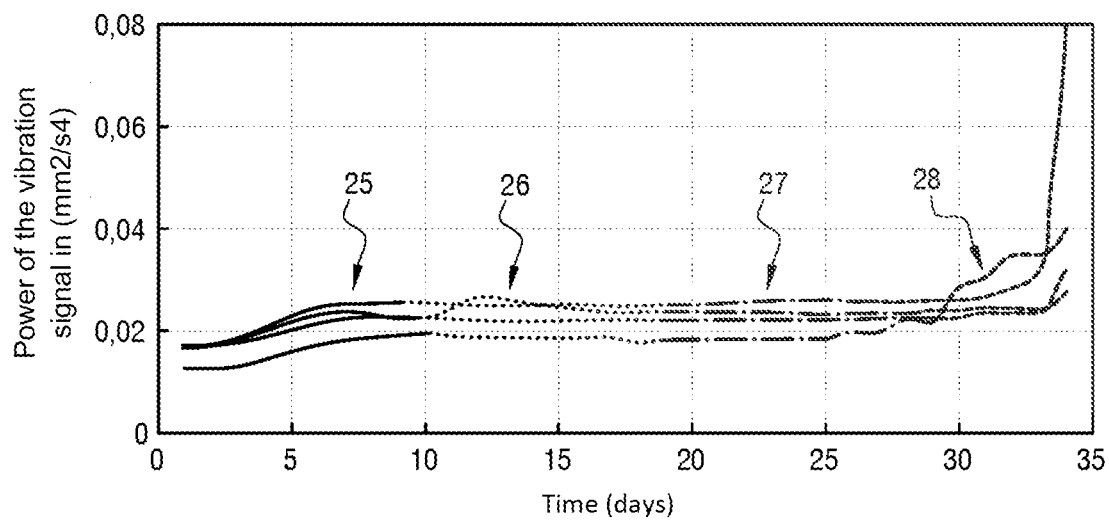
FIG. 8 is a graph showing curves of a vibration signal power versus time for four test equipment devices, said curves being partitioned according to four severity classes.
Figure 9:
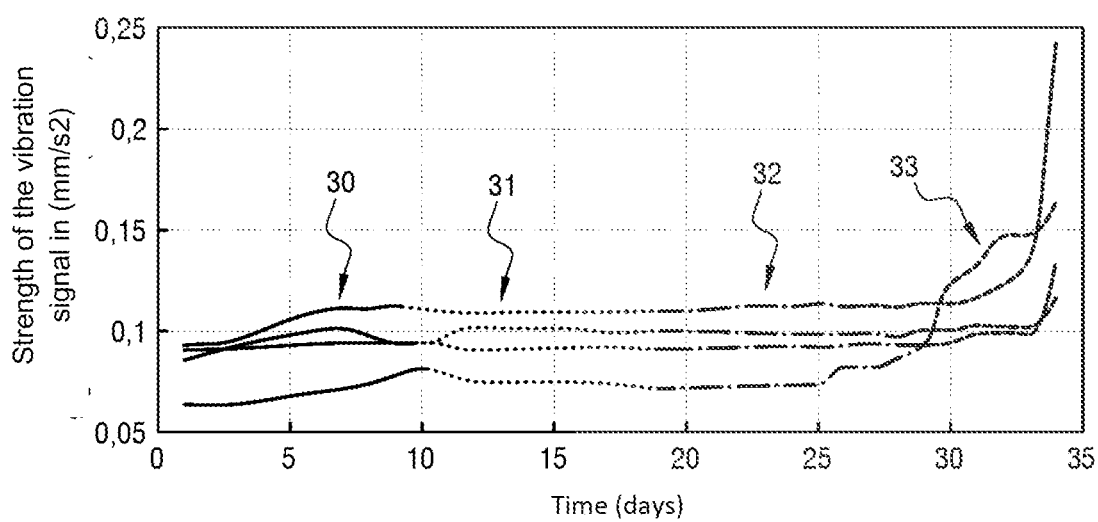
FIG. 9 is a graph showing curves of a vibration signal power versus time for four test equipment devices, said curves being partitioned according to four severity classes.
Figure 10:
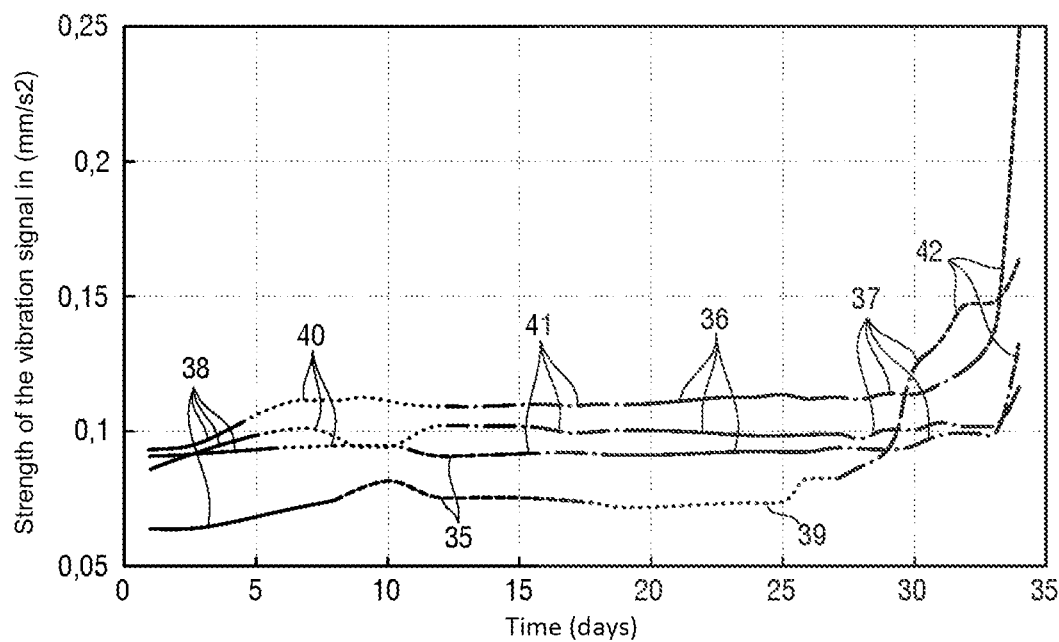
FIG. 10 is a graph showing curves of a vibration signal power versus time for four test equipment devices, said curves being partitioned according to four severity classes.

With reference to FIGS. 8 to 10, the results are shown for c=4.

The signature of interest in FIG. 8 is the strength of the vibration signal. A distinction is made between severity class 1 corresponding to curve sections 25 of the four test equipment, severity class 2 corresponding to curve sections 26, severity class 3 corresponding to curve sections 27 and severity class 4 corresponding to curve sections 28.

The signature of interest in FIG. 9 is the strength of the vibration signal. A distinction is made between severity class 1 corresponding to curve sections 30 of the four test equipment, severity class 2 corresponding to curve sections 31, severity class 3 corresponding to curve sections 32 and severity class 4 corresponding to curve sections 33.

It can be see that, for this number of classes, the temporal consistency is preserved and the level of convergence of the energy criterion has reached a reasonable level (reduced by two thirds). The first class corresponds to the run-in phase. The end-of-life phase is well insulated. The living environment is divided between two classes.

With reference to FIG. 10, it can be seen that choosing for example a number of classes c=8, with the same partitioning algorithm, results in a completely inconsistent partitioning of the classes. The signature of interest in FIG. 10 is the strength of the vibration signal. A distinction is made between severity class no 1 corresponding to the portions of curves 35 of the four test equipment devices, severity class no 2 corresponding to the portions of curves 36, severity class no 3 corresponding to the portions of curves 37, severity class no 4 corresponding to the portions of curves 38, severity class no 5 corresponding to the portions of curves 39, severity class no 6 corresponding to the portions of curves 40, severity class no 7 corresponding to the portions of curves 41 and severity class no 8 corresponding to the portions of curves 42.

The preliminary phase of the estimation process according to the invention then comprises a diagnosis step 44 (see FIGS. 2 and 3) which consists first of all of carrying out a first learning 45 of a severity diagnosis model.

The diagnosis consists of assigning each operating point to its nearest class for a given distance type. A classification model must therefore be trained to perform this task using data available in the dedicated database, said data coming from the test equipment devices.

Figure 11:
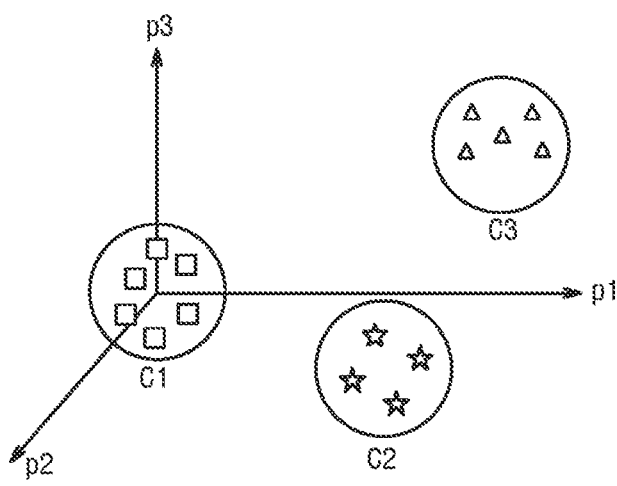
FIG. 11 is a graph showing an example of a discrete classification.

It would have been possible to use the classification method shown in FIG. 11.

In such a method, a similarity between a new observation and classes c1, c2, c3 is measured, with class c1 corresponding to no defect, class c2 corresponding to a first defect and class c3 corresponding to a second defect.

This classification is discrete and does not take into account the level of membership in a given class. However, another level of classification is chosen to assess the severity level of each failure mode, using fuzzy membership functions.

The first learning of the severity diagnosis model is based on the Fuzzy SVM (Space Vector Machine) classification algorithm with multi-class membership functions.

Figure 12:
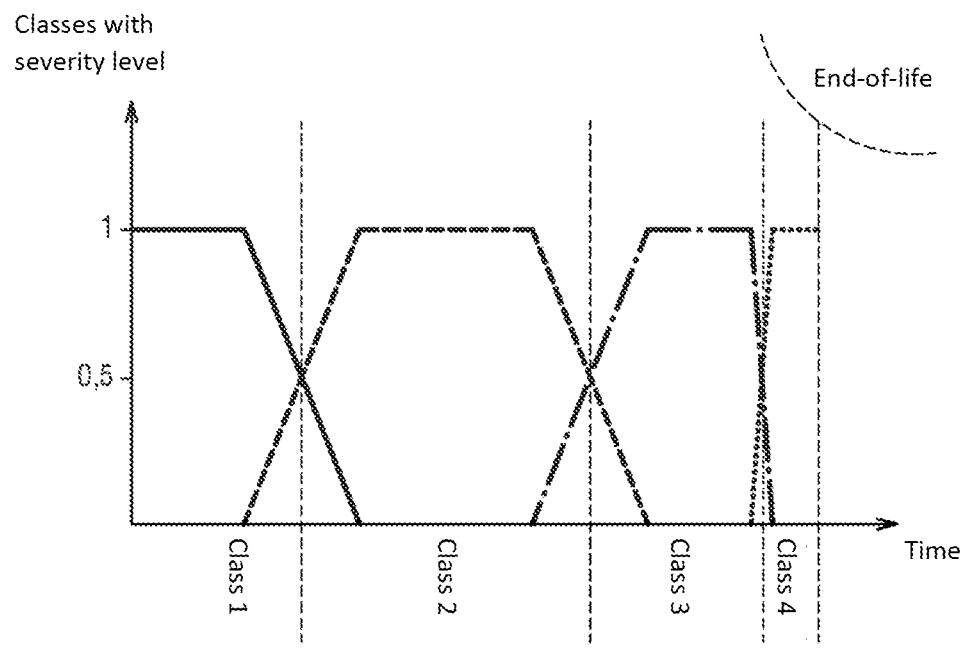
FIG. 12 is a graph showing the result of a classification with severity levels.

The diagnosis model is then implemented (step 46) and validated (step 47). The result of the classification with severity level can be seen in FIG. 12.

The preliminary phase of the estimation process according to the invention then comprises a prognosis step 50 (see FIGS. 2 and 3) which consists first of all of carrying out a first learning 51 of a severity prediction model.

The prognosis consists of extrapolating the signature into a finite horizon, which we will call the prediction horizon (step 54 in FIG. 2). The extrapolated signature is classified in the diagnosis sense and its level of severity is assessed at the predefined prediction horizon. The Remaining Useful Life can be deduced from this extrapolation.

First, the construction phase of the prediction model (which can also be called a regression model) is described.

A learning method for the prediction model is chosen. Predictions are made at several time steps, based on so-called "multi-step" strategies.

These predictions are based on a sequence of observations of past moments. This expresses itself under the form:

$$\hat{X}_{t+1 \to t+hp} = f_p(X_{t-n0 \to t}, \theta)$$

where:
- $X_{t-n0-t}$ is the sequence of n0 observations of signature values, up to t. These observations may concern a single signature, so the coefficients of $X_{t-n0-t}$ will have values in $\mathbb{R}$, or several signatures, so the coefficients will have values in $\mathbb{R}\ p$, with p the number of signatures;
- $f_p$ is the prediction model;
- the $\theta$ are the parameters of the prediction model;
- $\hat{X}_{t+1 \to t+hp}$ is the estimated sequence up to the prediction horizon hp.

The number of observations and the prediction horizon are usually set by the user.

If all the coefficients of $\hat{X}_{t+1 \to t+hp} \in \mathbb{R}$, we speak of uni-variate extrapolation. If the coefficients of $\hat{X}_{t+1 \to t+hp} \in \mathbb{R}^P$, we speak of multivariate extrapolation. This second case allows correlations between signatures to be taken into account.

The multi-step iterative method consists of learning a model to make predictions at t+1. Then the same model is iteratively run in series to make a prediction at t+hp.

The advantage of this method is that it is fairly easy to implement. The disadvantage is that error accumulates as predictions are made. Within the framework of aeronautical constraints, it is necessary to take into account a dimensional factor: the memory required to store the models. In view of these constraints, the iterative method seems to be a good choice as a first approach.

Figure 13:
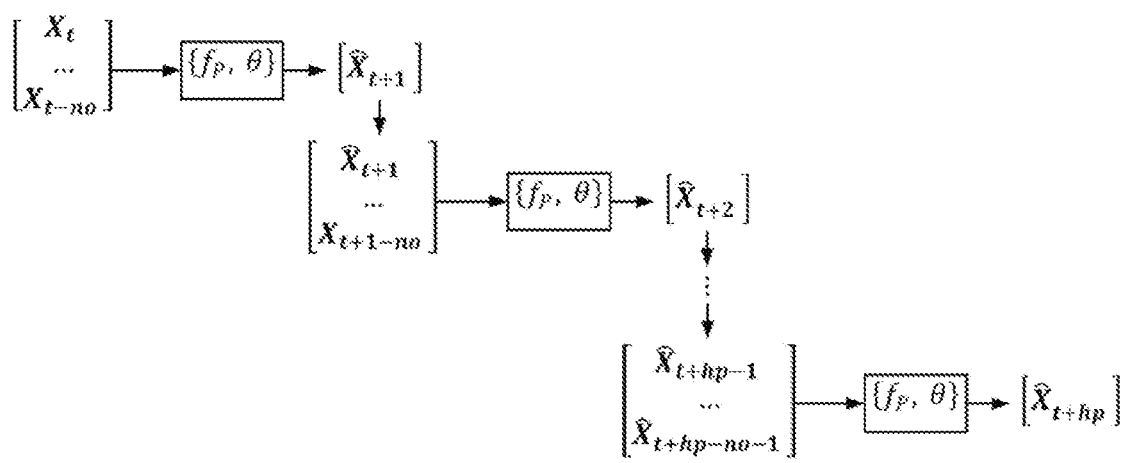
FIG. 13 shows the steps of a learning algorithm for a prediction model.

The algorithm for this method is summarised in FIG. 13.

The linear regression model itself is now described. The purpose of the time regression is to determine the parameter vector $\theta$ that determines the $f_p$ prediction model. This model, which can also be called a learning model, is built from a non-linear SVR (Support Vector Machine for Regression) regression. The objective of the latter is to provide a model predicting an output $y \in \mathbb{R}$ from a set of m labelled data $\{(x_1, y_1), \ldots, (x_m, y_m)\}$ ou $xi \in \mathbb{R}^P$, $p \in \mathbb{N}^*$, $i \in \{1, \ldots, m\}$ The algorithm must therefore find a function $f_p: \mathbb{R}^P \to \mathbb{R}$, which minimises the error on the learning set while having a good generalisation capacity. The regression problem can be formulated using the support vector machine formalism. This is based on the SVM with flexible margins. For a non-linear case, we use the kernel trick to reformulate the problem. The aim is to maximise the following function:

$$LR_D = -\frac{1}{2}\sum_{i=1}^{m}\sum_{j=1}^{m}(\alpha_i - \alpha_i^*)(\alpha_j - \alpha_j^*)K(x_i, x_j) - \varepsilon\sum_{i=1}^{m}(\alpha_i + \alpha_i^*) + \sum_{i=1}^{m}y_i(\alpha_i - \alpha_i^*)$$

Under the constraints:

$$\sum_{i=1}^{m}(\alpha_i - \alpha_i^*) = 0$$

$$0 \leq \alpha_i \leq C$$

$$0 \leq \alpha_i^* \leq C$$

where K is the kernel function which can be chosen such that:

$$K(x,x') = \tan h(a_k \cdot x \cdot x' + b_k),$$

and where ($\alpha i$, $\alpha i^*$) are the primary and dual Lagrange coefficients. The prediction function is then expressed as:

$$f_R(x) = \sum_{i=1}^{m}(\alpha_i - \alpha_i^*).K(x_i, x) + b$$

The constant b can be obtained from the KKT (Karush-Kuhn-Tucker) conditions applied on one of the support points, i.e. the points corresponding to:

$$0 = \sum_{i=1}^{m}(\alpha_i - \alpha_i^*).K(x_i, x) + b$$

for:

$$b = -\sum_{i=1}^{m}(\alpha_i - \alpha_i^*).K(x_i, x)$$

The prediction models are then implemented on all signatures (step 52) and validated (step 53).

The above description is applied to the roller or ball bearings 1 shown in FIG. 1.

SVR is implemented via the Statistics and Machine Learning Toolbox™ in Matlab®. Three prediction start times were tested: a start time at t=sp1=1 day (where no observations of the test equipment devices are used for learning), a start time at t=sp2=10.45 days, which corresponds to the end of the run-in phase, and a start time at t=sp3=20.65 days, which corresponds to the start of the penultimate severity class.

The prediction results are evaluated according to the Mean Absolute Percentage Error: MAPE), which is the dual of the cumulative relative accuracy.

$$MAPE = \sum_{i=1}^{m} \frac{|y_i - \hat{y}_i|}{|y_i|}$$

The prediction results are equivalent for test equipment devices.

Figure 14:
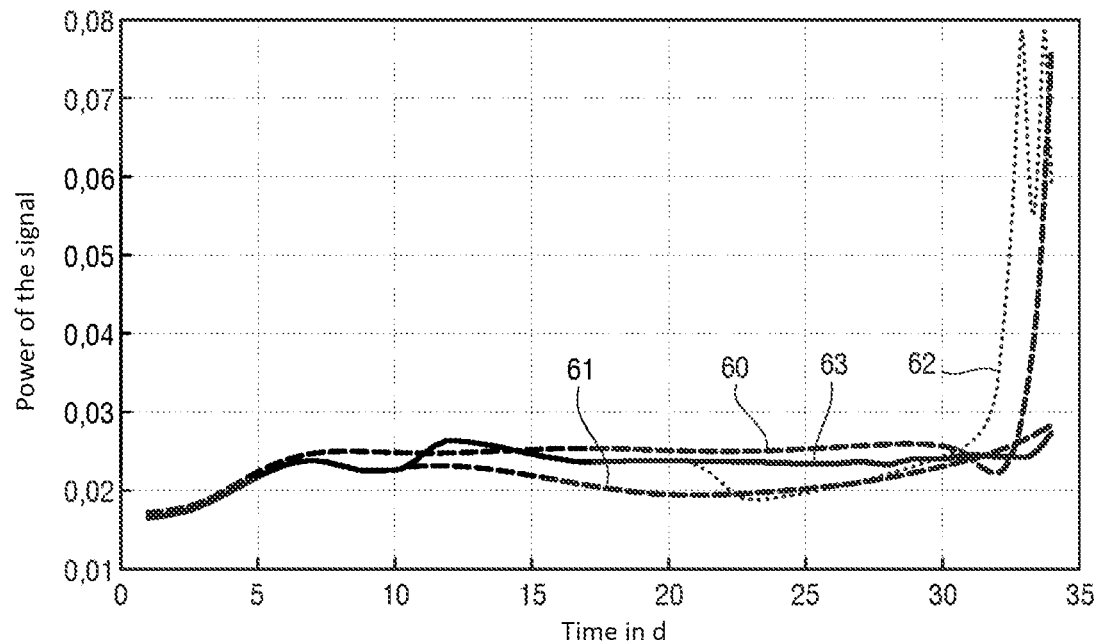
FIG. 14 is a graph comprising curves of a signal power versus time for a test equipment device, said curves being obtained using the prediction model.
Figure 15:
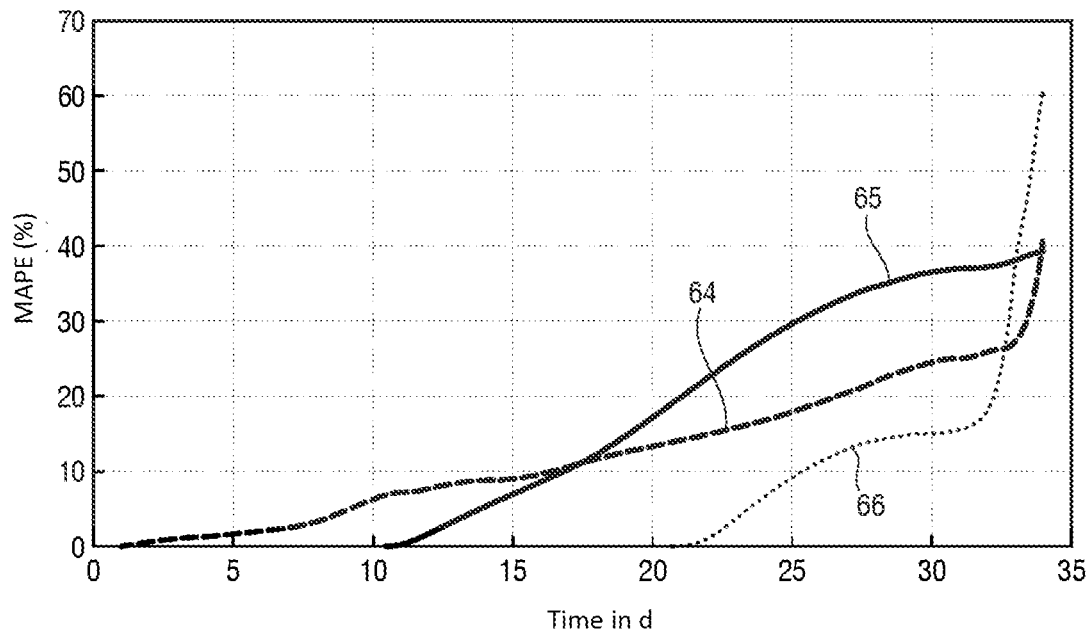
FIG. 15 is a graph comprising curves of the relative mean absolute error versus time for the prediction of the power of the vibration signal on one of the test equipment devices.
Figure 16:
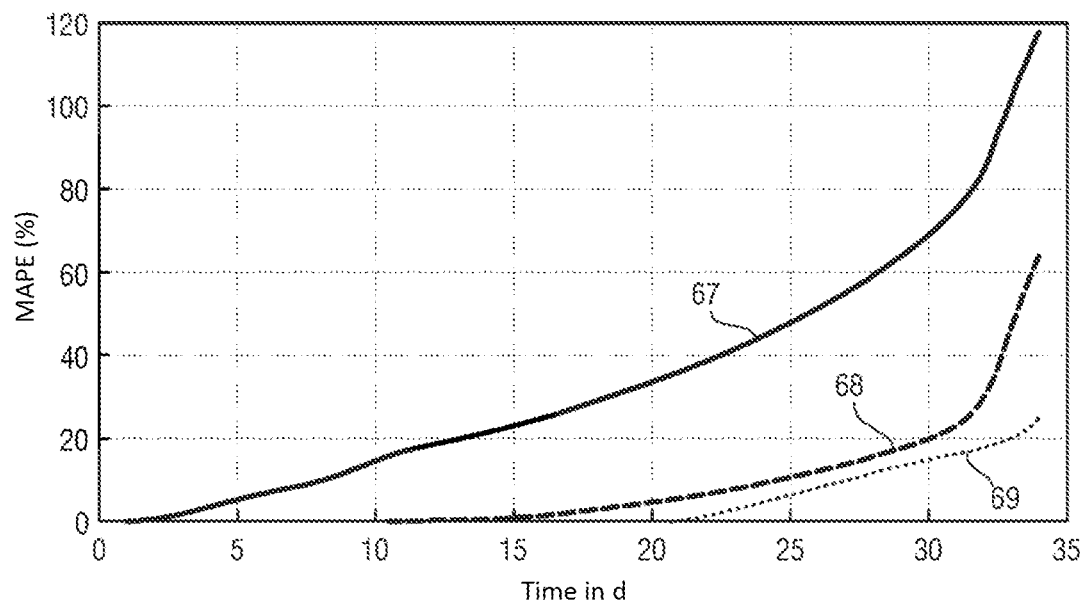
FIG. 16 is a graph comprising curves of the relative mean absolute error versus time for the prediction of the power of the vibration signal on one of the test equipment devices.

FIGS. 14 to 16 show the test results for bearing 1a. FIG. 14 concerns the prediction of the power evolution of the vibration signal.

Curve 60 corresponds to the start at t=sp1, curve 61 to the start at t=sp2, and curve 62 to the start at t=sp3. Curve 63 corresponds to the target, i.e. the actual development observed.

FIG. 15 shows the relative mean absolute error (MAPE) for the prediction of the vibration signal strength.

Curve 64 corresponds to the start at t=sp1, curve 65 to the start at t=sp2, and curve 66 to the start at t=sp3.

FIG. 16 shows the relative mean absolute error (MAPE) for the prediction of the vibration signal strength.

Curve 67 corresponds to the start at t=sp1, curve 68 to the start at t=sp2, and curve 69 to the start at t=sp3

The error increases with time, which is consistent with the use of an iterative method. In general, the greater the number of observations used for the subject equipment, the smaller the error. The error increases sharply for the last predictions. This is due to an overestimation of the exponential growth of the signature. However, this is after the end-of-life time of this unit, which is 28 days.

Figure 17:
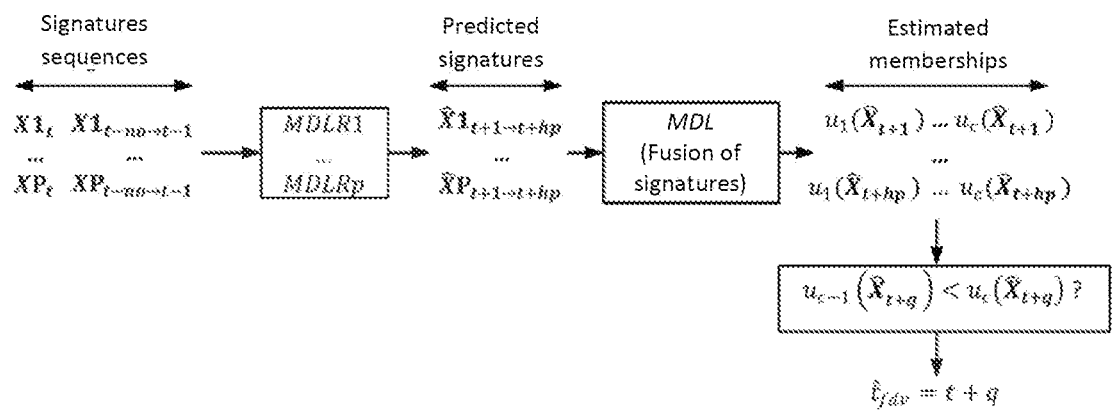
FIG. 17 shows the steps of a prediction and classification algorithm.

With reference to FIG. 17, the test phase that was carried out to experimentally validate the estimation process according to the invention is now described. As explained earlier, observations are available on four test equipment devices. The result of the prediction and thus the effectiveness of the estimation process according to the invention is evaluated by using these observations and comparing the results obtained with the Remaining Useful Lifes actually observed on these test equipment devices. One of the test equipment devices then becomes the subject device.

The MDLC classification models as well as the MDLR prediction models are considered to be already trained.

The operational phase includes the step of acquiring observations when in operation on the subject equipment. Signature sequences are produced.

Extrapolated time series representative of the evolution of signatures on the subject equipment are produced using the prediction model.

Predicted signatures from t+1 to t+hp are obtained. The extrapolated time series are classified using the diagnosis model.

Membership functions are calculated for the time series extrapolated to the severity classes. From these membership functions, the Remaining Useful Life of the subject equipment is derived.

The membership functions $u_j$ (j going from 1 to c) indicate the assigned failure class and its severity level.

The prognostic horizon is the gap between the time $t_{\alpha_e \beta_e}$ when the algorithm reaches the performance $\alpha_e$ (accuracy) and $\beta_e$ (precision) and the end-of-life time $t_{EOL}$ is written as follows:

$$PH = t_{EOL} - t_{+e\beta e}.$$

Figure 18:
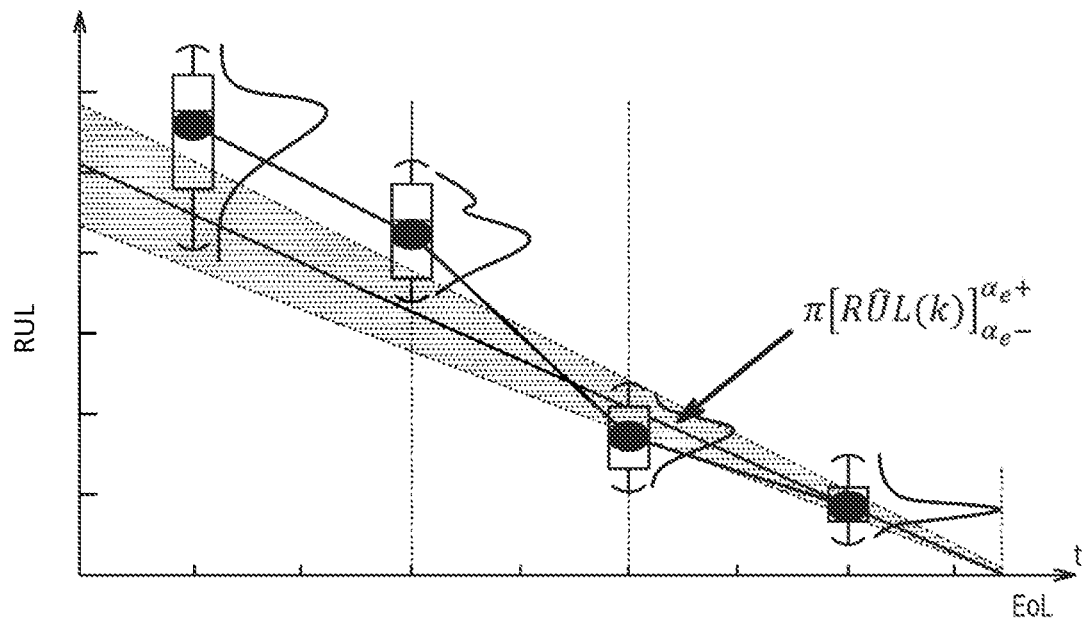
FIG. 18 is a graph showing the accuracy and precision performance of a Remaining Useful Life prediction algorithm.

With reference to FIG. 18, this criterion can be expressed from the averages of the RUL distributions or from the distributions themselves. We note then:

RUL(k): Actual RUL at time $t_k$;
$\hat{RUL}(k)$: Estimated RUL at time $t_k$;
π: RUL distribution;
$\beta_e$: minimum acceptable confidence (probability, possibility, ...) on the centre of gravity of the distribution π;
$\pi[\hat{RUL}(k)]_{\alpha_e-}^{\alpha_e+}$: distribution at time $t_k$ à±$\alpha_e$ of the actual RUL value.

The objective here is only to provide a trend, well in advance, so that maintenance operations can be anticipated.

Thus, the constant $\alpha_e$ will be defined to have an interval of ±15% around the initial RUL.

The implementation of the relative precision does not require any additional information. In contrast, the prognosis horizon and performance require further information.

Since the RUL is not given here as a distribution, the confidence level $\beta_e$ does not have to be defined. The prognosis horizon will therefore be calculated by:

$$PH = t_{EOL} - t_{\alpha e}, \text{ where:}$$

$t_{\alpha e}$ is the time from which the RUL estimate checks until the end of life:

$$\hat{RUL} \in [(1-\alpha_e)*RUL(0); (1+\alpha_e)*RUL(0)]$$

Figure 19:
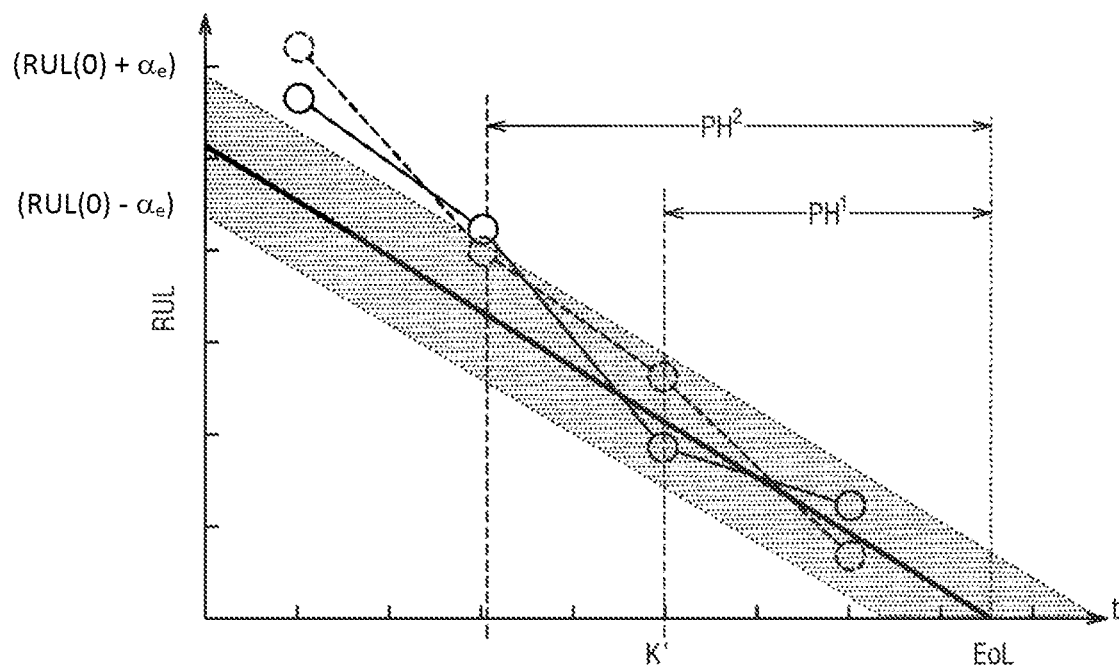
FIG. 19 is a graph showing an accurate comparison of two Remaining Useful Life prediction algorithms.
Figure 20:
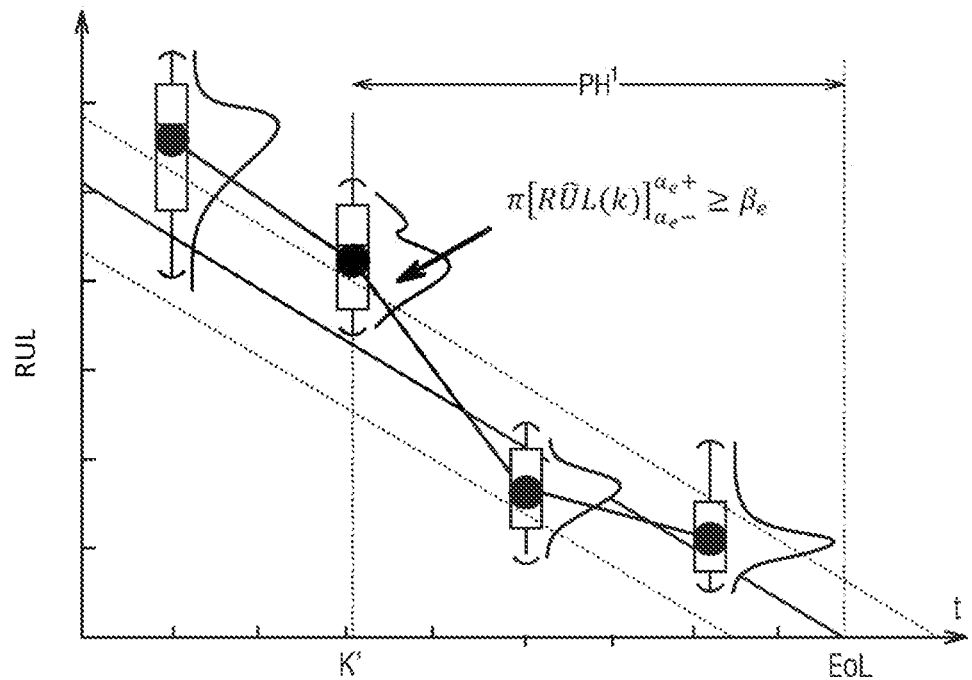
FIG. 20 is a graph showing the accuracy and precision performance of a Remaining Useful Life prediction algorithm.

The best horizon is obtained when the algorithm is always in the desired performance range and the worst when it is never there. In this case, $\alpha_e$ is the uncertainty interval on the initial RUL, RUL(0). FIGS. 19 and 20 illustrate an example of the performance of the prognosis horizon. FIG. 19 compares two algorithms according to the criterion $\alpha_e$. FIG. 20 shows the evaluation of an algorithm according to the criteria $\alpha_e$ and $\beta_e$ from the distributions.

The RUL(Remaining Useful Life) corresponds to the remaining life time from the current time t. The classification model then calculates the memberships $u_j$ (j ranging from 1 to c) of the severity classes. From this, the RUL is deduced as follows.

The estimated RUL is equal to the difference between the current (prediction) time minus the estimated end-of-life time q. Therefore, with 1≤q≤hp:

$$\widetilde{RUL} = q - t$$

where q is an estimated end-of-life time and t is a current time, and where, at the estimated end-of-life time q, the last severity class membership function becomes greater than the penultimate severity class membership function.

The membership of the last class c becomes higher than that of class c−1, and thus:

$$u_{c-1}(\hat{X}_{t+q}) < u_c(\hat{X}_{t+q})$$

Figure 21:
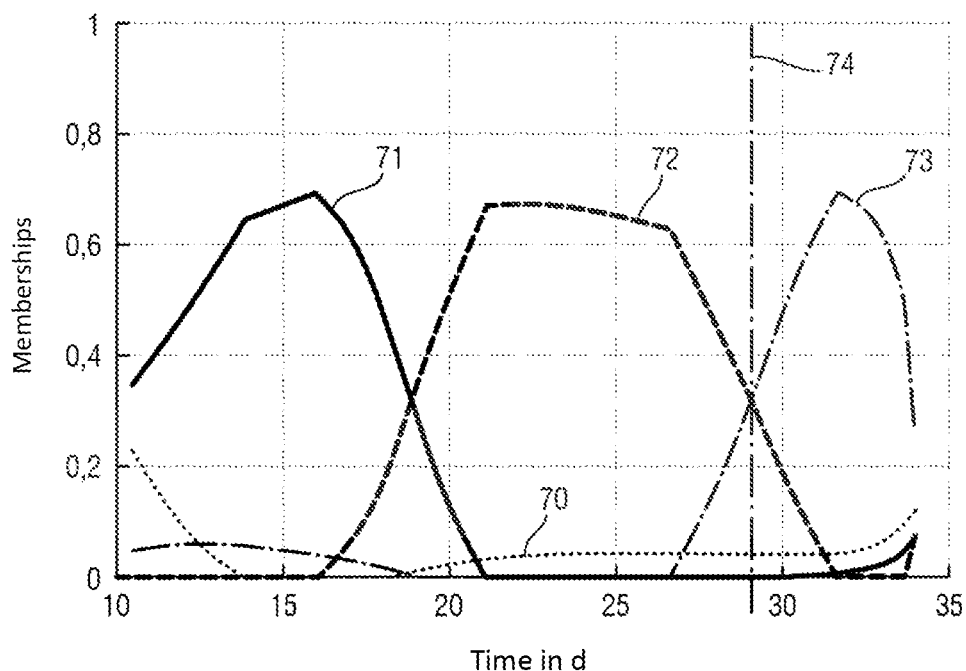
FIG. 21 is a graph showing estimated severity class membership curves for a subject equipment.

As an example, the graph in FIG. 21 gives the estimates of the membership of bearing 1d (with learning performed on bearings 1a, 1b and 31c) from the predictions at t=10.45 days.

Curve 70 corresponds to the u1 class 1 membership function, curve 71 corresponds to the u2 class 2 membership function, curve 72 corresponds to the u3 class 3 membership function and curve 73 corresponds to the u4 class 4 membership function.

The limit 74 corresponds to the beginning of class 4, i.e. the last class, and therefore to the end-of-life time.

Thus, the end-of-life time is estimated to be: q=27.23 days and the remaining lifetime: $\overline{RUL}$ =q−t=27.23−10.45=16.78 days.

Figure 22:
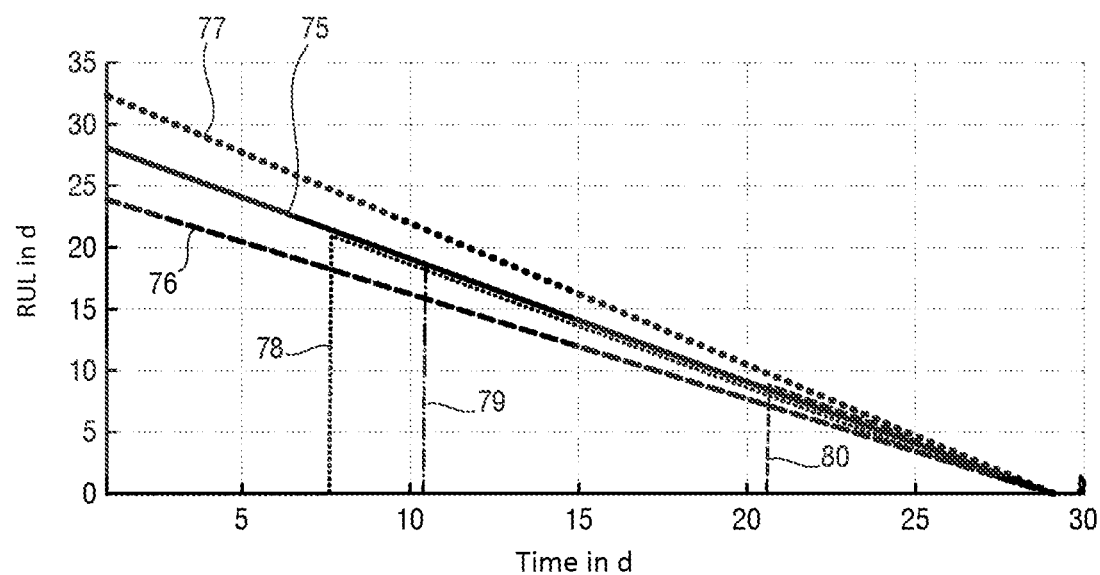
FIG. 22 is a graph comprising Remaining Useful Life estimation curves from two different times for the subject equipment.

In addition to the prediction t=sp2=10.45 days, the estimation of the Remaining Useful Life of the 1d roll was also carried out by two other prediction models t=sp1=7.5 days and t=sp3=20.65 days. FIG. 22 shows the convergence to the correct EOL value as it approaches the EOL within a +/−15% starting tolerance that converges to 0% at the actual EOL.

Curve 75 is the actual value of the remaining useful life. Curve 76 corresponds to the lower tolerance and curve 77 to the upper tolerance. Curve 78 corresponds to the prediction t=sp1, curve 79 corresponds to the prediction t=sp2, curve 80 corresponds to the prediction t=sp3.

It can be seen that all three estimates are very close to the actual RUL, which shows that the estimation process according to the invention is very accurate. Of course, the invention is not limited to the described embodiment but encompasses any alternative solution within the scope of the invention as defined in the claims.

The invention claimed is:

1. A method for estimating a Remaining Useful Life of a subject equipment, comprising a preliminary phase comprising the following steps:
    acquire test observations on test equipment devices (1a, 1b, 1c, 1d) similar to the subject equipment (step 10);
    produce, from the test observations, test time series ($S_x$) of at least one signature;
    partition the test time series to obtain severity classes corresponding to ageing phases of the test equipment devices (step 14);
    carry out a first learning of a diagnosis model on the test equipment devices (step 45);
    perform a second learning of a prediction model of the signature (step 51); and an operational phase comprising the following steps:
    acquire observations when in operation on the subject equipment;
    produce an extrapolated time series representative of the evolution of the signature on the subject equipment using the prediction model;
    classify the extrapolated time series using the diagnosis model;
    calculate a membership function of the extrapolated time series to the severity classes;
    deduce, from the membership function, the Remaining Useful Life of the subject equipment, the estimated Remaining Useful Life being such that:
    $\overline{RUL}$=q−t
    where q is an estimated end-of-life time and t is a current time, and where, at the estimated end-of-life time q, the last severity class membership function becomes greater than the penultimate severity class membership function.

2. The estimation method according to claim 1, wherein a temporal consistency criterion is used to define a number of severity classes produced by the partitioning.

3. The estimation method according to claim 2, wherein the temporal consistency criterion is evaluated using a first metric defined by:

$$CT_k = \sum_{i=2}^{m_u} ct(x_k^{(i)}, x_k^{(i-1)})$$

where $x_k^{(i)}$ is an $i^{th}$ test observation acquired for the test equipment device k and where ct is a temporal consistency between two successive test observations and is defined using the following formula:

$$ct(x_k^{(i)}, x_k^{(i-1)}) = \begin{cases} 1, & si\ y_k^{(i)} = y_k^{(i-1)} \\ 0, & si\ y_k^{(i)} \neq y_k^{(i-1)} \end{cases}$$

where $y_k^{(i)}$ is the severity class of the observation $x_k^{(i)}$.

4. The estimation method according to claim 1, wherein a second metric, which is an energy metric, is evaluated to select a partitioning algorithm.

5. The estimation method according to claim 4, wherein the energy metric is defined as:

$$E_{par} = \frac{1}{2} \sum_{i \in [1,\ldots,c]} \sum_{x^{(j)} \in \Omega_i} \|x^{(j)} - g_i\|_d^2$$

where $\Omega_i$ is a set of test observations of an $i^{th}$ class, the $x^{(j)} \in R^p$ are the test observations, $g_i$ is a centre of gravity of the $i^{th}$ severity class, d is a distance measure and is defined by:
$$d_{ij}^2 = d(x^{(j)}, g_i)^2 = \|x^{(j)} - g_i\|_d^2 = (x^{(j)} - g_i)^T A_d (x^{(j)} - g_i)$$

where $A_d$ is a positive semidefinite matrix defining a distance metric, and where the symbol "$\|\ \|_d$" represents the norm corresponding to the distance d.

6. The estimation method according to claim 4, wherein the partitioning algorithm is a C-Fuzzy Mean algorithm.

7. The estimation method according to claim 1, wherein the prediction model is trained with a multi-step iterative method.

8. The estimation method according to claim 1, wherein the prediction model is constructed from a non-linear SVR regression.

9. The estimation method according to claim 1, wherein the first learning of the diagnosis model uses a Fuzzy SVM-FA classification algorithm.

* * * * *